US009365320B1

(12) United States Patent
Erickson

(10) Patent No.: US 9,365,320 B1
(45) Date of Patent: Jun. 14, 2016

(54) ATTACHABLE STORAGE CONTAINER APPARATUS

(71) Applicant: LJA Companies, LLC, Taylor Falls, MN (US)

(72) Inventor: Chad Steven Erickson, Center City, MN (US)

(73) Assignee: LJA Companies, LLC, Minneapolis, MN (US)

( * ) Notice: Subject to any disclaimer, the term of this patent is extended or adjusted under 35 U.S.C. 154(b) by 34 days.

(21) Appl. No.: 13/951,955

(22) Filed: Jul. 26, 2013

Related U.S. Application Data

(60) Provisional application No. 61/676,620, filed on Jul. 27, 2012.

(51) Int. Cl.
*B67D 1/07* (2006.01)
*A47G 19/00* (2006.01)
*B65D 21/02* (2006.01)
*B65D 25/20* (2006.01)

(52) U.S. Cl.
CPC ...................... *B65D 25/20* (2013.01)

(58) Field of Classification Search
CPC B05B 11/0078; B05B 11/0005; A47L 13/26; B65D 23/12; B65D 21/0228; B65D 21/0201; B65D 21/0237; B65D 71/502; B65D 81/32; B65D 81/3205; B65D 51/28; A47G 23/03; A45F 3/16; A47K 2010/389
USPC ................. 220/737, 694, 699, 697, 729, 735, 220/23.83, 23.86, 23.4; 206/216, 217, 223, 206/229, 233; 215/386, 393, 390; 239/289, 239/302, 303; 222/192
See application file for complete search history.

(56) References Cited

U.S. PATENT DOCUMENTS

| | | | |
|---|---|---|---|
| 373,752 A | 2/1888 | Ader | |
| 1,903,312 A | 4/1933 | Ellis | |
| 1,942,953 A * | 1/1934 | Bennett | 206/229 |
| 4,054,220 A | 10/1977 | Rosenstein | |
| 4,273,459 A | 6/1981 | Hardy | |
| 4,795,028 A | 1/1989 | Wittig et al. | |
| 5,165,546 A | 11/1992 | Jaeger et al. | |
| 5,531,353 A | 7/1996 | Ward et al. | |
| 5,535,889 A * | 7/1996 | Lin | 206/546 |
| 5,664,671 A * | 9/1997 | Nedblake, Jr. | 206/217 |
| 5,671,872 A | 9/1997 | Daniels, Jr. | |
| 5,819,989 A | 10/1998 | Saraceni | |
| 5,865,350 A * | 2/1999 | Losenno et al. | 222/402 |
| 6,082,595 A | 7/2000 | Lin | |

(Continued)

*Primary Examiner* — Shawn M Braden
(74) *Attorney, Agent, or Firm* — Berggren Law Offices, LLC; William R Berggren; Stephen F Wolf

(57) ABSTRACT

A storage container apparatus comprises four elements. The first element is a top of a compartment with a substantially horizontal surface and an outer edge that is within 0.25 inches of the sides proximate the bottom of a commercial material container. The second element is sides of the compartment that joins the outer edge of the top, extends downward, and ends in a beaded edge. The third element is a base of the compartment with a top, bottom, and edge. The top of the base has a groove channel proximate the edge that is able to detachably attach to the beaded edge of the side and the edge of the base extends outward from the channel at least 0.13 inches. The fourth element is a joining element that affixes the top of the storage compartment to the bottom of one of at least two differently branded commercial material containers.

16 Claims, 10 Drawing Sheets

(56) References Cited

U.S. PATENT DOCUMENTS

| | | | |
|---|---|---|---|
| 6,138,874 A | 10/2000 | Audrey | |
| 6,216,920 B1 | 4/2001 | Baggett | |
| 6,302,608 B1* | 10/2001 | Holmes et al. | 401/125 |
| 6,321,937 B1* | 11/2001 | DeSimone et al. | 221/45 |
| 6,431,405 B2 | 8/2002 | Irwin | |
| 6,644,563 B2 | 11/2003 | Presson | |
| 6,945,416 B2 | 9/2005 | Manno | |
| 7,303,347 B1 | 12/2007 | Duncan | |
| 7,585,125 B2 | 9/2009 | Muhlhausen | |
| 7,743,947 B2 | 6/2010 | Flasch | |
| 2002/0100760 A1* | 8/2002 | Rinks | 220/574 |
| 2004/0182886 A1 | 9/2004 | McKay | |
| 2005/0133538 A1 | 6/2005 | Herrmann | |
| 2005/0188482 A1* | 9/2005 | Matthews | A63B 47/04 15/21.2 |
| 2006/0102585 A1 | 5/2006 | Richardson | |
| 2006/0186144 A1 | 8/2006 | Tinsley | |
| 2008/0049415 A1 | 2/2008 | McKay, Sr. | |
| 2010/0181390 A1* | 7/2010 | Huang | 239/289 |
| 2012/0048874 A1* | 3/2012 | Oakes et al. | 220/839 |
| 2013/0056463 A1* | 3/2013 | Buck | 220/23.83 |

* cited by examiner

Commercial Containers with Ridges Proximate Bottom

| Product | Company | Shape & Volume, Fl. Oz. | Bottom Dimension inches | Bottom Ridge inches |
|---|---|---|---|---|
| Greased Lightning cleaner and degreaser | Home Care Labs, Inc Lawrenceville, GA | Round 32.0 | 3.5 diameter, 11.0 circumference | 0.5 raised |
| Greased Lightning Orange Blast cleaner and degreaser | Home Care Labs, Inc Lawrenceville, GA | Round 32.0 | 3.5 diameter, 11.0 circumference | 0.5 raised |
| SC Johnson Professional Heavy Duty Degreaser | SC Johnson & Sons, Inc, Racine, WI | Round 32.0 | 3.25 diameter, 10.21 circumference | 0.5 raised |
| SC Johnson Professional Shower & Tub Cleaner | SC Johnson & Sons, Inc, Racine, WI | Round 32.0 | 3.25 diameter, 10.21 circumference | 0.5 raised |
| SC Johnson Professional Grout Cleaner | SC Johnson & Sons, Inc, Racine, WI | Round 32.0 | 3.25 diameter, 10.21 circumference | 0.5 raised |
| Stone Care International Counter Top Cleaner | Stone Care International, Inc. Owings Mills, MD | Round 22.0 | 3" diameter, 9.42 circumference | 0.63 raised |
| Crown RV & Boat Cleaner | Crown Marketing, Inc. Nicholasville, KY | Round 32.0 | 3.38 diameter, 10.63 circumference | 0.5 raised |
| Rubbermaid 32oz Heavy Duty Spray Bottle | Newell Rubbermaid Wooster OH, | Round 32.0 | 3.38 diameter, 10.63 circumference | 0.5 raised |
| Mr Clean Professional disinfecting restroom cleaner | Procter & Gamble, Cincinnati, OH | Square 32.0 | 3.75 x 3.75(back) to 3.0 (front), | 0.5 raised |
| Mr Clean Professional disinfecting multi purpose cleaner | Procter & Gamble, Cincinnati, OH | Square 32.0 | 3.75 x 3.75(back) to 3.0 (front), | 0.5 raised |
| Mr Clean Professional disinfecting cleaner with bleach | Procter & Gamble, Cincinnati, OH | Square 32.0 | 3.75 x 3.75(back) to 3.0 (front), | 0.5 raised |
| Mr Clean Professional Glass Cleaner | Procter & Gamble, Cincinnati, OH | Square 32.0 | 3.75 x 3.75(back) to 3.0 (front), | 0.5 raised |
| Mr. Clean Professional heavy duty degreaser | Procter & Gamble, Cincinnati, OH | Square 32.0 | 3.75 x 3.75(back) to 3.0 (front), | 0.5 raised |

FIG. 1

Commercial Containers with Ridges Proximate Bottom

| Product | Company | Shape & Volume, Fl. Oz. | Bottom Dimension, inches | Bottom Ridge inches |
|---|---|---|---|---|
| Tech Grout Cleaner (includes grout brush, plastic wrapped and tie strapped to outside) | Tech Enterprises Inc. Madison, WI | Rectangular 32.0 | 4.0 x 2.5 | 0.5 raised |
| Tech final answer carpet cleaner and spot remover | Tech Enterprises Inc. Madison, WI | Rectangular 32.0 | 4.0 x 2.5 | 0.5 raised |
| Green Works Glass Cleaner | Clorox Company Oakland, CA | Rectangular 32.0 | 4.0 x 3.0 | 0.5 raised |
| Green Works all purpose cleaner | Clorox Company Oakland, CA | Rectangular 32.0 | 4.0 x 3.0 | 0.5 raised |
| Green Works natural glass and surface cleaner, Commercial Solutions | Clorox Company Oakland, CA | Rectangular 32.0 | 4.0 x 3.0 | 0.5 raised |
| 409 Stone and Steel Cleaner | Clorox Company Oakland, CA | Rectangular 32.0 | 4.0 x 3.0 | 0.5 raised |
| 409 Glass and Surface Cleaner | Clorox Company Oakland, CA | Rectangular 32.0 | 4.0 x 3.0 | 0.5 raised |
| 409 All Purpose Cleaner | Clorox Company Oakland, CA | Rectangular 32.0 | 4.0 x 3.0 | 0.5 raised |
| Tilex Bathroom Cleaner Lemon Scent | Clorox Company Oakland, CA | Rectangular 32.0 | 4.0 x 3.0 | 0.5 raised |
| Tilex Mold and Mildew Remover | Clorox Company Oakland, CA | Rectangular 32.0 | 4.0 x 3.0 | 0.5 raised |
| Tilex Fresh Shower | Clorox Company Oakland, CA | Rectangular 32.0 | 4.0 x 3.0 | 0.5 raised |
| Simple Green All-Purpose Cleaner Lemon Scent | Sunshine Makers, Inc. Huntington Beach, CA | Rectangular 32.0 | 4.0 x 2.8 | 0.5 raised |
| Concentrated Simple Green All-Purpose Cleaner | Sunshine Makers, Inc. Huntington Beach, CA | Rectangular 32.0 | 4.0 x 2.8 | 0.5 raised |

FIG. 2

Commercial Containers with Ridges Proximate Bottom

| Product | Company | Shape & Volume, Fl. Oz. | Bottom Dimension, inches | Bottom Ridge inches |
|---|---|---|---|---|
| Clorox Kitchen Cleaner + Bleach (can use on Granite and Stainless Steel) Floral Scent | Clorox Company Oakland, CA | Rectangular 32.0 | 4.0 x 3.0 | 0.5 raised |
| Clorox Clean-up Cleaner Plus Bleach Citrus Scent | Clorox Company Oakland, CA | Rectangular 32.0 | 4.0 x 3.0 | 0.5 raised |
| Clorox Clean-up Cleaner with Bleach Fresh Scent | Clorox Company Oakland, CA | Rectangular 32.0 | 4.0 x 3.0 | 0.5 raised |
| Clorox Clean-up Cleaner with Bleach Original Scent | Clorox Company Oakland, CA | Rectangular 32.0 | 4.0 x 3.0 | 0.5 raised |
| Clorox Disinfecting Bathroom Cleaner | Clorox Company Oakland, CA | Rectangular 32.0 | 4.0 x 3.0 | 0.5 raised |
| Clorox Bleach Foamer for the Bathroom | Clorox Company Oakland, CA | Rectangular 32.0 | 4.0 x 3.0 | 0.5 raised |
| Meguiar's Vinyl and Rubber Cleaner & Protectant. (# 57 Marine-RV) | Meguiar's Inc. Irvine, CA | Rectangular 16.0 | 4.0 x 2.0 | 1.0 raised |
| Meguiar's Oxidation Remover Heavy Duty Cleaner (# 49 Marine-RV) | Meguiar's Inc. Irvine, CA | Rectangular 16.0 | 4.0 x 2.0 | 1.0 raised |
| Meguiar's Cleaner Wax One Step (# 50 Marine-RV) | Meguiar's Inc. Irvine, CA | Rectangular 16.0 | 4.0 x 2.0 | 1.0 raised |
| Meguiar's Cleaner Wax (Auto) | Meguiar's Inc. Irvine, CA | Rectangular 16.0 | 4.0 x 2.0 | 1.0 raised |
| Meguiars Hot Rims All Wheel & Tire Cleaner | Meguiar's Inc. Irvine, CA | Rectangular 24.0 | 5.0 x 2.0 | 0.5 raised |
| Meguiars High Gloss Hot Shine Tire Spray | Meguiar's Inc. Irvine, CA | Rectangular 24.0 | 5.0 x 2.0 | 0.5 raised |

FIG. 3

Commercial Containers with Smooth Sides Proximate Bottom

| Product | Company | Shape & Volume, Fl. Oz. | Bottom Diameter inches<br>Bottom Circumference inches | Bottom Edge |
|---|---|---|---|---|
| Lucas Slick Mist Tire & Trim Shine | Lucas Oil Products, Inc. Corona, CA | Round 24.0 | 2.75 diameter, 8.64 circumference | Smooth |
| Lucas Slick Mist Speed Wax | Lucas Oil Products, Inc. Corona, CA | Round 24.0 | 2.75 diameter, 8.64 circumference | Smooth |
| Whink Counter Top Cleaner | Whink Products Company, Eldora, IA | Rectangular 24.0 | 3.5 x 2.0 | Smooth |
| Whink Glass/Ceramic Cook Top Cleaner | Whink Products Company, Eldora, IA | Rectangular 24.0 | 3.5 x 2.0 | Smooth |
| Weiman Stainless Steel Cleaner & Polish | Weiman Products, LLC Gurnee, IL | Rectangular 12.0 | 3.5 x 2.0 | Smooth |
| Weiman Cooktop Daily Cleaner | Weiman Products, LLC Gurnee, IL | Rectangular 12.0 | 3.5 x 2.0 | Smooth |
| Weiman Granite Cleaner & Polish | Weiman Products, LLC Gurnee, IL | Rectangular 12.0 | 3.5 x 2.0 | Smooth |
| Weiman Heavy Duty Gas Range Degreaser | Weiman Products, LLC Gurnee, IL | Rectangular 12.0 | 3.5 x 2.0 | Smooth |
| Weiman Leather Cleaner & Conditioner | Weiman Products, LLC Gurnee, IL | Rectangular 12.0 | 3.5 x 2.0 | Smooth |
| Pledge Multi Surface Everyday Cleaner | S.C. Johnson & Son, Inc. Racine, WI | Rectangular 16.0 | 4.0 x 2.5 | Smooth |
| Pledge Furniture Spray Revitalizing Oil | S.C. Johnson & Son, Inc. Racine, WI | Rectangular 16.0 | 4.0 x 2.5 | Smooth |

FIG. 4

ATTACHABLE STORAGE CONTAINER APPARATUS

FIELD OF THE INVENTION

This invention relates to material containers, with attachable bases and those bases with accessories therein.

BACKGROUND OF THE INVENTION

There is a need for storage containers that can be attached to existing commercial material containers.

Currently the marketplace is filled with material containers. These containers are durably made for such materials as, for example, solids such as cereal or coffee, liquids such as cleaners or weed killing materials, pastes such as shoe polish or cosmetic creams, and gases such as hair spray or other aerosol products.

Each material generally has accessories that are used often in conjunction with the material. These accessories may include, for example, funnels, measuring cups, and concentrates for reusable containers. They may also include for single use materials such accessories as, for example, disposable wipes, colorants, scouring or polishing pads, can openers, plumbing snakes, and so forth, the list is endless.

In addition, the user generally stores these accessories in different locations from that where the material containers are located. This presents the user with a challenge of assembling the needed materials and accessories when a task is to be performed.

A material container that contains an attachable base with or without at least one associated accessory is known. However, these relate to specific containers and bases that are sold as a unit and disposed of when the material is consumed. In addition, most material containers are not available with a specially designed base apparatus attached to the bottom of the container.

There is a need for a way to keep the commercial materials together with the needed accessories. This is especially true for accessories that are useful for the life of at least several if not many containers of material products and are easily misplaced if not attached to the containers.

SUMMARY OF THE INVENTION

I have invented an attachable storage container apparatus that can hold at least one accessory and can be attached to the bottom of at least two differently branded commercial material containers. The storage container apparatus comprises four elements. The first element is a top of a compartment with a substantially horizontal surface and an outer edge that is within 0.25 inches of the sides proximate the bottom of a commercial material container. The second element is sides of the compartment that joins the outer edge of the top, extends downward, and ends in an edge. The third element is a base of the compartment with a top, bottom, and edge. The top of the base has a groove channel proximate the edge that is able to detachably attach to the edge of the side and the edge of the base extends outward from the channel at least 0.13 inches. The fourth element is a joining element that affixes the top of the storage compartment to the bottom of the commercial material container.

I have also invented a method of using an attachable storage container apparatus with one of at least two differently branded conventional material containers. The method comprises three steps. The first step is providing a commercial material container with material that ranges from solid to liquid to gas. The second step is providing the above storage container apparatus. The third step is engaging the joining element to attach the top of the storage container apparatus to the bottom of the conventional commercial material container proximate.

As used herein:

"Concentrate" means a fluid-soluble concentrate in a pre-weighed amount that is dissolved that will thoroughly dissolve in a reasonable period of time of less than ten (10) minutes with water, alcohol, other fluids, or mixtures thereof.

"Disposable wipe" means a plurality of disposable sheets in a collection that permits dispensing of sheets one at a time such as, for example, toilet paper rolls, paper towel rolls and box or packet of tissue paper that are separated by scoring or an arrangement of individual sheets folded in an alternating interwoven stacked manner.

"Reusable wipe" means a reusable non-paper sheet or pad-wiping element for smoothly spreading dispensed fluid onto a surface or scouring or polishing a surface once fluid is dispensed. The element is composed of reusable material such as, for example, cloth, a micro-porous non-woven polymeric material or a membrane that is washable in a washing basin or conventional residential washing machine, reusable sponges, scouring pads such as, for example, SCOTCH-BRITE® by 3M Company of Maplewood, Minn., and clay bar used for polishing automotive surfaces.

My invention has several benefits over what is known. My invention permits a user to attach a storage container apparatus to one of most is not all substantially flat-bottomed material containers that previously was purchased for a use and place desirable accessories in the base to be used with the material. This is regardless of the shape of the sides of the commercial container or whether it has side ridges or protrusions, or has smooth sides. In addition, the extended edge provides addition al standing stability of the apparatus in combination with a commercial container. Moreover, the storage container apparatus can be opened from the bottom for easy access to the contents. Furthermore, the user may transfer that storage container apparatus to another material container of similar bottom dimensions for multiple reuses or even attach multiple stacks the storage container apparatus to a single material container for storage of additional accessories. This is particularly beneficial for accessories that can be used over the life of several single-use material containers. Also, a material container does not have to be specially designed to be releasably attached to the base apparatus.

BRIEF DESCRIPTION OF THE DRAWINGS

One or more features or forms of the invention are described in the accompanying drawings. The drawings are described briefly below.

FIG. 1 is a table showing the dimensions of the bottoms of various material containers having ridges proximate their bottoms.

FIG. 2 is a table showing the dimensions of the bottoms of various material containers having ridges proximate their bottoms.

FIG. 3 is a table showing the dimensions of the bottoms of various material containers having ridges proximate their bottoms.

FIG. 4 is a table showing the dimensions of the bottoms of various material containers having smooth sides proximate their bottoms.

DETAILED DESCRIPTION OF SOME EMBODIMENTS OF THE INVENTION

Figure 5:
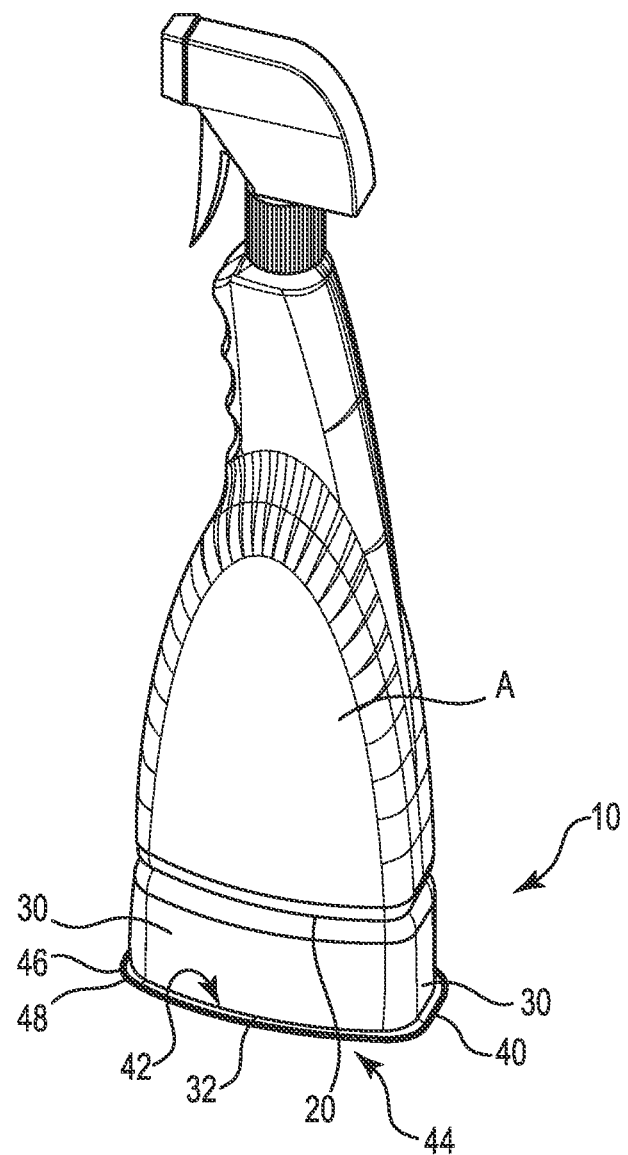
FIG. 5 is a perspective view from the upper right of an embodiment of the invention attached to a spray head dispensing container product.

There is an ongoing desire in society for more convenience. This is particularly true when people want to perform tasks involving materials in containers. Generally, these tasks require additional accessories that are often stored elsewhere and are difficult to locate. Frequently, people are driven to buy new accessories because they cannot find the ones that they previously purchased.

I have invented an apparatus and a method of using the apparatus to solve this problem. My apparatus is a storage container apparatus that has a top dimension that is approximately similar in cross-section to the bottom of the material container. The storage container apparatus attaches to that bottom and has a base that releasably connects to the sides of the storage container. In some embodiments, the base extends outward from the connection point to provide additional standing stability of the joined combination. At least one accessory generally associated with tasks involving the material may be placed into the apparatus before it is releasably attached to an individually obtained material container. Alternatively, this apparatus may already contain at least one such accessory.

There are numerous teachings of material containers with detachable bases that are able to contain accessories or come with them. However, none of them are just a base apparatus designed to attach to at least two commercially available material containers from at least two different products that are sold separately and designed to detachably attach to these series of material containers.

Currently material containers with detachable bases that can hold various items are known. U.S. 2006/0102585 is a representative reference that teaches a reusable water bottle that contains a detachable base member that can be used to hold change, car keys, or other personal objects of the user's choice. The container is altered with a screw thread to match the screw thread on the top of the inside of the base. U.S. 2006/0186144 teaches a dip-tube style spray bottle with a conical bottom, detachable screw-on base, and no accessory. These containers are not designed to be sold separately from the storage bases and require a joining element that matches with the storage base.

Material containers with detachable bases that contain specific accessories useful in the use of the material are also known. Representative references include, for example, the following. U.S. Pat. No. 6,431,405 teaches a combined fluid container and pop-up sheet product dispensing system within a detachable base that snaps onto the bottom of the container. The fluid container is specially modified to detachably fit the base and is not designed to be available apart from the base. U.S. Pat. No. 6,321,937 teaches an aerosol dispensing system with an aerosol container having a bottom designed to snap-fit onto a detachable base that is designed to be a wipe dispenser when removed from the container. U.S. Pat. No. 1,942,953 teaches a fluid container with a beaded base designed to friction-fit within the larger beaded opening of a base having accessories such as wipes and a removable base cap to access the accessories. This is taught and designed to be sold as a unit. U.S. Pat. No. 1,903,312 teaches a corn cure package comprising a fluid container adapted to affix by various methods to a similarly adapted detachable base containing pads for the treatment of a corn. This is taught and designed to be sold as a unit. U.S. Pat. No. 7,585,125 teaches a fluid container with a modified bottom releasably attached to a modified opening of a base that contains cloth wipes. This is taught and designed to be sold as a unit.

Similar references teach detachable systems that are also designed to be sold together to address a convenience need for a user. Representative references include, for example, the following. U.S. Pat. No. 7,303,347 teaches a stain removing kit comprising a container of fluid with an applicator in the fluid attached to the cap, and a base releasably attached to the bottom of the container and enclosing a soft absorbent material pad or sponge. U.S. Pat. No. 4,795,028 teaches a primary container and a base container where each are modified with opposing ribs to permit the inside top of the base to snap onto the outside bottom of the container and a handle on the outside of the top of the base to facilitate separation of the base from the container. The base can hold companion accessories. U.S. Pat. No. 5,531,353 teaches a drinking container with a detachable base where the bottom of the container has a circular concave region designed to snap-on to the ridge inside the top of the base. A container top can be used as a support under the base for further stability. U.S. Pat. No. 5,165,546 teaches a pharmaceutical container with detachable base to hold drug information where both container and base are modified with a groove and flange to achieve a snap-fit. U.S. Pat. No. 4,054,220 teaches a pocket sized flask container for cleaning dentures comprising an upper container for fluid, a lower container fixed to the upper container and open at the bottom for receiving a denture, and a base that releasably fits over the lower container to seal the lower compartment hole so as to retain cleaning fluid. The base is also used to transfer fluid from the upper chamber to the lower chamber. The base surrounds the lower part of a container so that the outside of the base is flush with the outside of the upper part of the flask container and both have retention bosses and apertures to cause the detachable snap-fit. U.S. Pat. No. 378,752 teaches a bottle with a top compartment and a bottom compartment, both having screwable caps at each end to access the individual compartments. U.S. Pat. No. 6,945,416 teaches a valuable storing apparatus comprising a cylindrical sleeve for holding valuables and two bottles releasably friction-fitted within each end up to internal stops to form the appearance of one taller bottle. U.S. 2004/0182886 teaches cleaning apparatus comprising an aerosol cleaning fluid container surrounded by a releasably attached lint roller frame covered by a tacky adhesive surface to retrieve lint. Each are designed and taught to be sold as a unit comprising the container and the base with the container and the base being modified to releasably attach to each other.

Material containers with detachable bases also include proprietary fluid container assemblies with detachable bases that permit the dispensing of off-the-shelf paper towels. Representative references are as follows. U.S. Pat. No. 6,644,563 teaches a combined portable, cleaning fluid spray apparatus and paper towel support and dispensing apparatus. U.S. Pat. No. 7,743,947 teaches a cleaning tool. U.S. Pat. No. 6,216,920 teaches a combined spray bottle and paper towel holder. U.S. Pat. No. 6,138,874 teaches a dispenser for fluids and paper towels. U.S. Pat. No. 5,819,989 teaches a combined liquid and paper towel dispenser. U.S. Pat. No. 5,671,872 teaches a liquid container and paper towel holder. All of these teach a unique assembly including a material container that is substantially smaller than conventional stand-alone cleaning fluid containers and a detachable base that I have invented.

Material containers with detachable bases also include spray bottles in combination with other accessories. Represent references are as follows. U.S. 2008/0049415 teaches a stain and odor detection and cleaning system without a detachable base that comprises a battery-powered black light source affixed to the side of a cleaning fluid container to detect stains and urine. U.S. 2005/0133538 teaches a spray container configured to have an accessory holder that is releasably attached to the side of the container. U.S. Pat. No. 6,082,595 teaches a detergent dispenser container with a window wiper slideably mounted to the side of the container with no base. U.S. Pat. No. 4,273,459 teaches a cleaning system comprising a liquid dispensing bottle with a squeegee device affixed to the dispensing head of the container. All of these teach a unique assembly including a material container and either an accessory or a detachable compartment in locations other than the bottom of the container.

All of the above are designed and taught to be sold as a unit comprising the material container and the storage base. In each case, both the container and the base are modified to releasably attach to each other. No teaching or suggestion is made that the container is to be sold separately from the releasable base or that the releasable base is to be attached to other containers of similar design even if they contain the same branded product sold in material containers without releasable bases. Certainly, no teaching or suggestion is made for the storage base to be releasably attached to material containers of different products under the same brand or of different products under different brands. For the purpose of this document, "differently branded products" means different products under the same brand. See FIGS. 1 to 4 for examples of differently branded products with similar bottom dimensions.

Material containers come in a variety of containers with different shapes and sizes. An increasing number containing different products or brands are standardizing some of those shapes to accommodate store shelf considerations. Many of the material containers that are made of plastic are also made with a ridge also the outside of the bottom of the container that augments stability of the material container and decreases the likelihood of the material container tipping over. FIG. 1 through FIG. 3 are tables showing examples of these material containers. As seen, differently branded material containers or those that contain different products often come in similar shapes proximate their bottoms with similarly shaped ridges.

Other material containers have smooth substantially flat sidewalls with little or no protrusions proximate the bottom. These material containers may be made of a variety of materials such as, for example, plastic, metal, or glass. They generally come in standardized sizes. FIG. 4 is a table showing examples of these material containers. As seen, differently branded material containers or those that contain different products often come in similar shapes proximate their bottoms with smooth sides.

I have invented a storage container apparatus that is able to be connected with the bottom of a conventional material container containing commercial material. The storage container apparatus comprises at least four elements, a top, sides, base and joining element. The first element, the top, has a substantially horizontal surface and an outer edge that is within 0.25 inches of the sides proximate the bottom of a commercial material container.

The second element, the sides, joins the outer edge of the top, extends downward, and ends in a beaded edge.

The third element is a base with a top, bottom and edge. The top of the base has an attachment element that detachably attaches to the ends of the sides. The edge of the base extends outward from the bottom of the channel at least 0.13 inches. In some embodiments, the edge extends outward at least 0.25 inches. In some embodiments, the edge extends outward at least 0.5 inches. The extension increases the standing stability of the storage container when it is connected to the bottom of the material container. In some embodiments, the base and the sides are attached at one place by a hinge. This prevents the base from being completely detached from the container and possibly misplaced.

The attachment element is able to detachably attach the base to the sides. As an example, the attachment element in one embodiment is a groove channel proximate the edge that is able to detachably attach to an edge of the side that may have a bead on the edge to facilitate attachment in a tongue and groove or snap-fit manner. As another example, the attachment element in one embodiment is a somewhat vertical wall that fits in a friction fit manner into the inside of the side edges and may be stepped for easier attachment.

The fourth element is a joining element that affixes the top of the storage compartment to the bottom of the commercial material container. Joining elements are known to the art and include, for example, double-coated adhesive tapes double-coated adhesive foam tapes and adhesive-backed mechanical fasteners such as, for example a hook and loop fastener such as VELCRO®. Some are designed to not be easily removed from surfaces to which they are adhered. Some are designed to join two surfaces in an unreleasable manner. Some are designed to join two surfaces in a releasable manner. The joining element may include various numbers of strips, pads, or patches The commercially available material containers have various shapes and contents as long as each is independently available to a user. Some material containers may contain solids such as, for example, coffee. Other material containers may contain fluid ranging from pourable to paste consistency. In addition, the bottom the material containers may have any shape including, for example, the shape of a circle, oval, square, rectangle, or polygon.

Some embodiments may have bases that are modified to perform additional tasks. Some embodiments have scrubbing surfaces such as, for example, built-in plastic or rubber bristle molding on the outside of the base for large area scrubbing. Some embodiments have scrubbing surfaces on the outside corners of the base for spot cleaning. Some embodiments have double-sided adhesively-backed mechanical fasteners adhesively adhered to the outer surface of the bottom and able to be adhered to scrubbing and cleaning pads such as, for example, SCOTCH BRITE® by 3M Company of Maplewood, Minn. Some embodiments hold the scrubbing pad to the bottom with double-coated adhesive tape with each side of a different tackiness so that one side is repositionable or with both sides having similar tackiness.

The storage container apparatus may further comprise at least one accessory stored within the storage container apparatus and useful in the use of the material. The accessories are as varied as the branded material to which the base is to be associated. Some embodiments include at least one accessory from a group consisting of a funnel for use in dispensing fluid concentrate and dilution fluid in to the container, at least one reusable wipe element for smoothly spreading dispensed fluid onto a surface, and a concentrate for making the fluid when dissolved in dilution fluid. Some embodiments include at least one of the accessories from a group consisting of an abrasive smoothing material for obtaining smooth finishes and an abrasive material for cleaning surfaces. Some embodiments include at least one of the accessories from a group consisting of a collection of disposable wipe elements. Some embodiments include an opening adaptable to the withdrawal of an accessory such as a wipe from the collection of disposable wipes. Some embodiments include at least one accessory that is a collection of detachable disposable wipe sheets. Some embodiments include accessories associated with the preparation of coffee. Some embodiments include accessories that are devices such as a snake for cleaning drains, paint can key openers, or removable pouring spouts. The list is endless as long as the storage container apparatus is configured as described above to releasably attach to at least two differently branded material containers that are separately available to a user.

Figures five to ten further describe some embodiments of my invention. The same numbers are used to designate the same elements. FIG. 5 is a perspective view from the upper right of an embodiment of the invention attached to a spray head dispensing container product. Commercially available material container (A) is show attached to a storage container apparatus (10) by its top (20) adhering to the bottom of material container A. A commercial material container and storage container apparatus having substantially similarly—dimensioned substantially rectangular attachment surfaces is shown but other contours such as, for example, circular oval and square may be used as described above. Sides (30) are attached to a base (40) with a friction fit attachment set of elements comprising side edge (32) surrounding the matching ridge of the base (not shown). The top of the base (not shown) is inside storage container apparatus 10 and the bottom of the base (not shown) is outside storage container apparatus 10. A small lip or flange (48) extends outward from the base.

Figure 6:
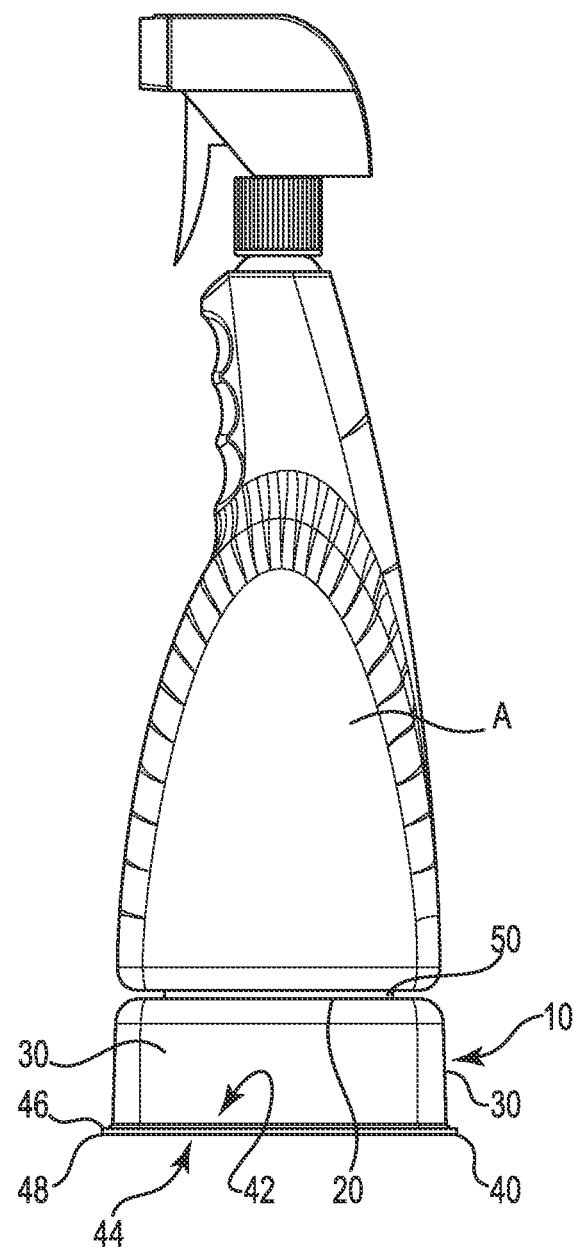
FIG. 6 is a front view of the embodiment of FIG. 5.

FIG. 6 is a front view of the embodiment of FIG. 5. The elements are the same as discussed above. Lip 48 is more clearly seen. Also seen is the space showing a joining element (50) that was not clearly seen in FIG. 5.

Figure 7:
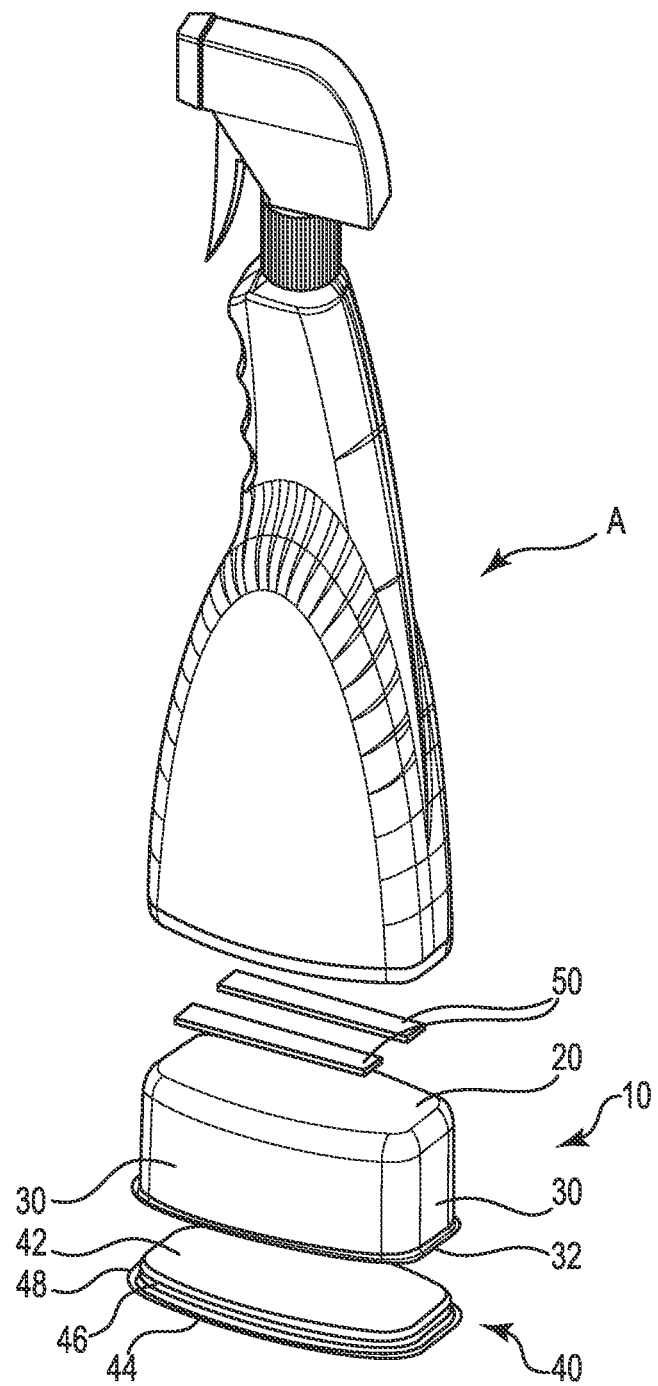
FIG. 7 is an exploded perspective view from the upper right of the embodiment of FIG. 5.

FIG. 7 is an exploded perspective view from the upper right of the embodiment of FIG. 5. Here joining element 50 is clearly seen. Also clearly seen is the detachably attachable element set shown as a friction fit set. The first detachably attachable element is on the side that is near edge 32. A second detachably attachable element (46) is on base 40.

Figure 8:
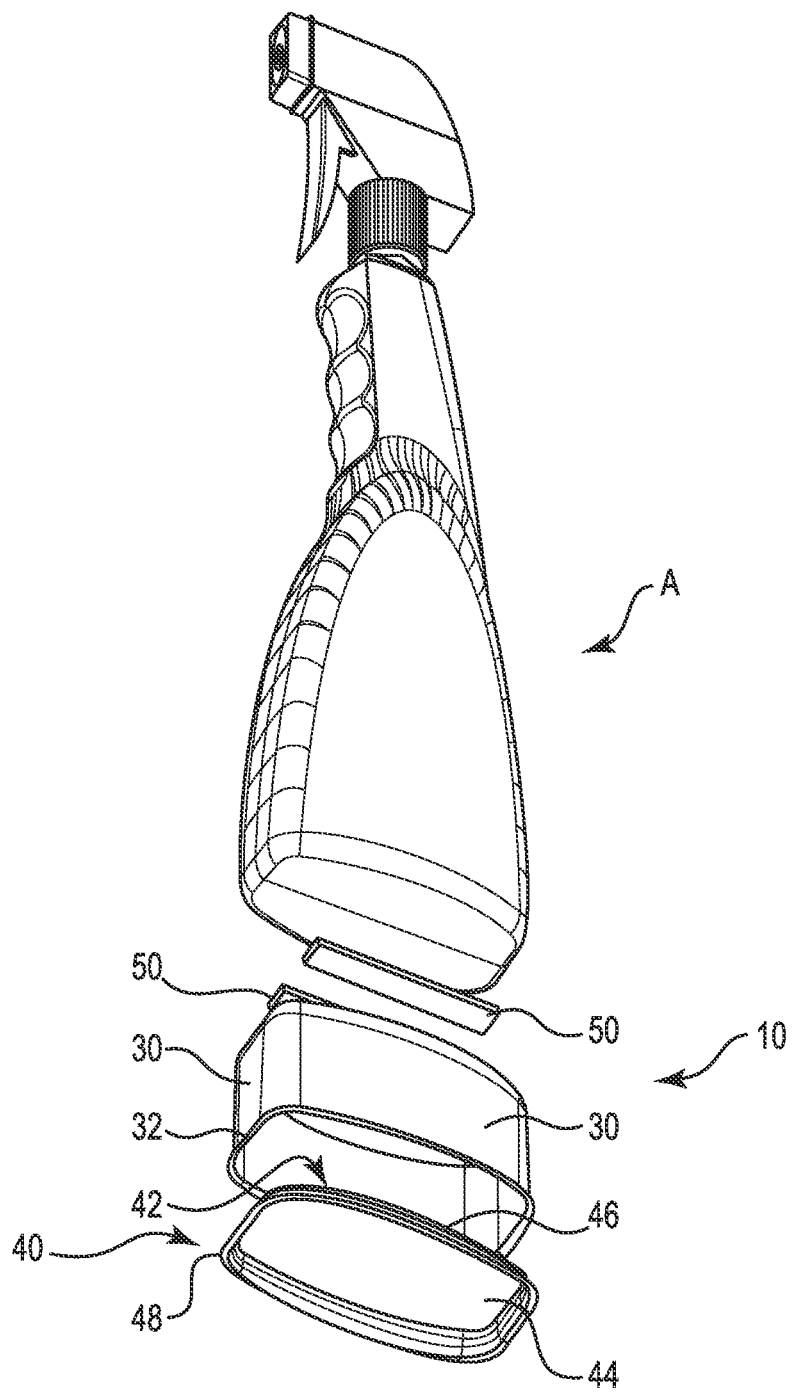
FIG. 8 is an exploded perspective view from the lower left of the embodiment of FIG. 5.

FIG. 8 is an exploded perspective view from the lower left of the embodiment of FIG. 5. This perspective more clearly shows how second attachment element 46 fits into the first attachment element near edge 32.

Figure 9:
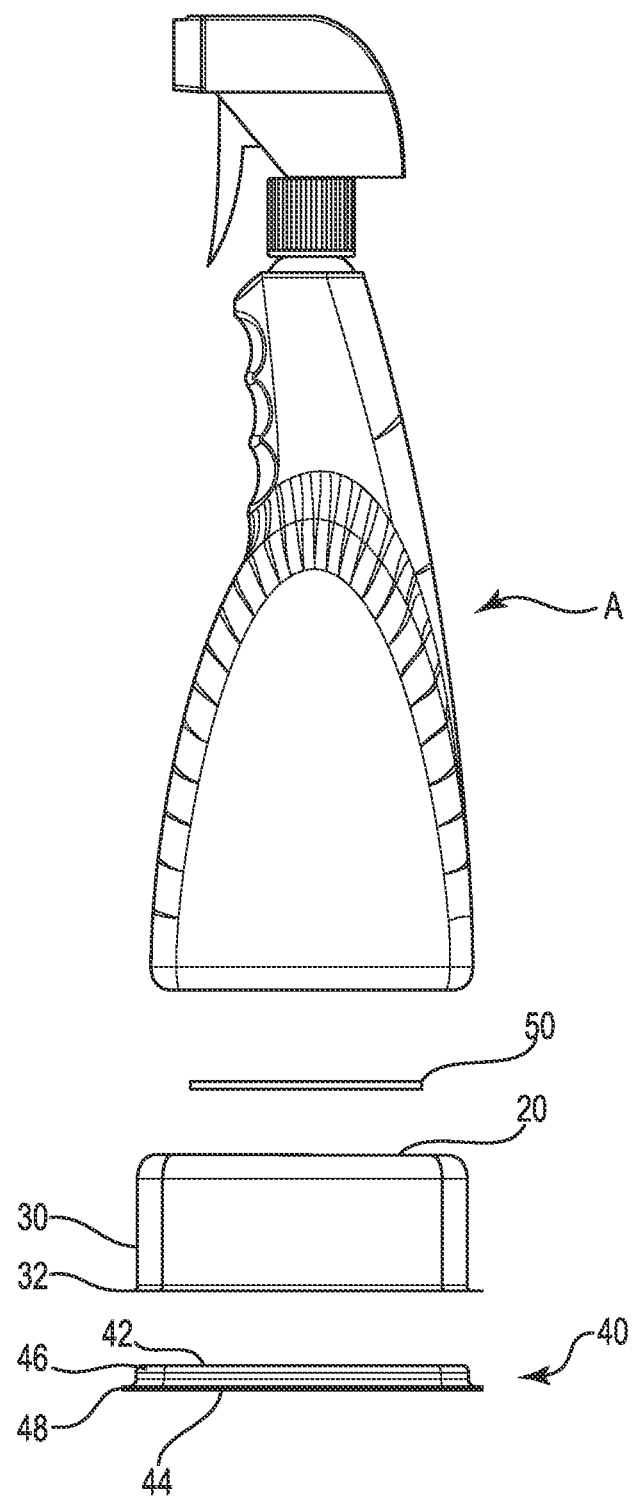
FIG. 9 is an exploded side view of the embodiment of FIG. 5.

FIG. 9 is an exploded side view of the embodiment of FIG. 5. This combined with FIGS. 5-8 clearly show the configuration of this embodiment of the invention.

Figure 10:
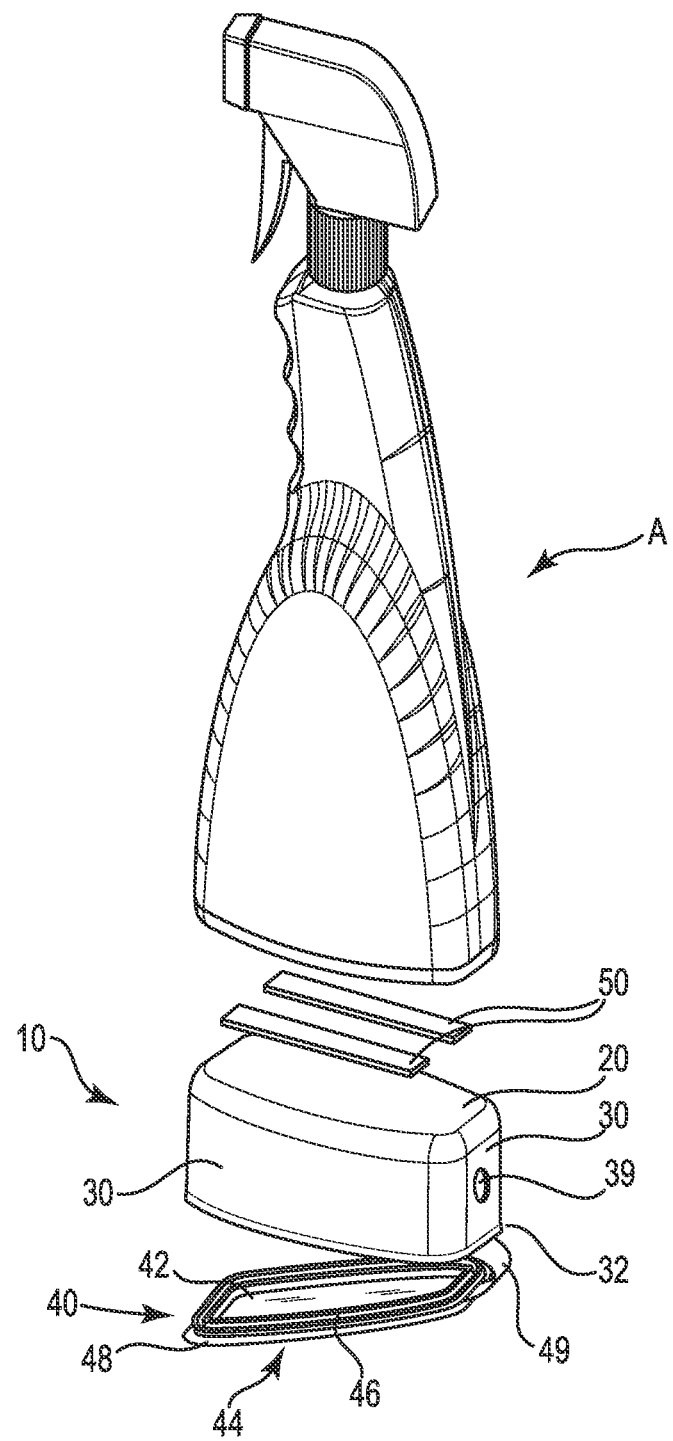
FIG. 10 is an exploded perspective view from the upper right of another embodiment.

FIG. 10 is an exploded perspective view from the upper right of another embodiment. Similar elements are shown here as above except a different detachably attachment element set is shown. A tongue and groove attachment is shown in this figure. Also, a more extended lip 48 is illustrated. In addition, a perforation or hole (39) is depicted that is useful in allowing accessories such as paper towels to be removed from storage container apparatus 10 without detaching base 40 from sides 30. Side 30 and base 40 are attached with a hinge (49).

The storage container apparatus, except for the joining elements, can be made from a variety of methods known to the art. Three are discussed below but are meant to be non-exclusive examples. A first manufacturing method is thermoforming. Material may be PET, rigid PVC, PE or another thermoformable resin in sheet form. These materials are relatively slippery and hard.

A second manufacturing method is blow molding. This is the same technology used to mold virtually all spray bottles. Material may be PET, rigid PVC, PE or other blow moldable resin. These materials are relatively slippery and hard. The storage container top and side may be molded individually or with two conjoined, identical mirrored parts that would require separation after molding.

A third manufacturing method is injection molding. Material used with this method can be virtually any injection moldable resin. Rigid resins such as, for example, ABS, rigid PVC, polystyrene (PS), PET, polypropylene (PP) could be molded into the storage container apparatus.

We have also invented a method of using a storage container apparatus able to be connected at its top to a bottom of one of at least two conventional material containers. The method comprises three steps. The first step is providing a commercial material container with material that ranges from solid to liquid to gas. The second step is providing the above storage container apparatus in its broadest sense. The third step is engaging the joining element to attach the top of the storage container apparatus proximate to the bottom of the conventional commercial material container.

Some embodiments of the method may comprise a storage container apparatus that contains various additional elements. These embodiments may further comprise a fourth step of using the accessories. Some of these embodiments may further comprise a fifth step of placing the accessories back into the storage container apparatus upon completion of use. In some embodiments, the commercial material container is a commercial fluid container and the commercial material is a commercial fluid that ranges from pourable liquid to spreadable paste. In some embodiments, the method further comprises a sixth step, the step of placing in the storage container apparatus at least one accessory that is useful in the use of the material in the commercial material container. Some embodiments comprise a seventh step, the step of detachably attaching an accessory to the outside of the base of the storage container apparatus. The method aspect of the invention may also include the provision of additional elements to the storage container apparatus and additional steps of use according to the above teachings.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

I claim:

1. An apparatus comprising:

an attachable storage container configured to be connected to a bottom of at least one material container, the material container having smooth, substantially flat sidewalls with little or no protrusions proximate the bottom of the material container, wherein the material container comprises sides unified with the bottom, wherein the sides of the material container and the bottom of the material container are smooth and the bottom of the material container is substantially horizontal, and wherein the attachable storage container comprises a compartment, the compartment comprising:

a compartment top having a substantially horizontal surface and an outer edge that is within 0.25 inches of the material container sides proximate the bottom of the material container, compartment sides continuously united with the outer edge of the compartment top, extending downward, ending in an edge comprising a first part of an attachment element, and a compartment base comprising a second part of an attachment element that is configured to detach and attach in a repeatable manner to the first part of the attachment element, and the compartment base is extended outward from the second part of the attachment element at least 0.13 inches and is configured with structure to provide increased standing stability of a combination of the attachable storage container and a material container; and a releasable joining element configured to affix the compartment to the bottom of the material container.

2. The apparatus of claim 1 wherein the compartment base extends outward from the second part of the attachment element at least 0.25 inches.

3. The apparatus of claim 1 wherein the compartment edge extends outward from the second part of the attachment element at least 0.50 inches.

4. The apparatus of claim 1 wherein the joining element is selected from double-coated adhesive tape, double-coated adhesive foam tape, and adhesive-backed mechanical fasteners.

5. The storage container apparatus of claim 4 wherein the joining element comprises adhesive-backed mechanical fasteners.

6. The apparatus of claim 1 wherein the material container comprises a spray bottle.

7. The apparatus of claim 1, further comprising, at least one accessory stored in the compartment of the attachable storage container.

8. The apparatus of claim 7 wherein the accessory comprises a collection of disposable wipes and the apparatus, further comprises an opening through the sidewall of the attachable storage container, adaptable to the withdrawal of a wipe from the collection of disposable wipes.

9. The apparatus of claim 1 wherein the attachment element is selected from a tongue and groove attachment and a friction fit attachment.

10. A method of using an attachable storage container configured to be connected to a bottom of at least one material container, comprising the steps of:

providing a first material container having sides unified with the bottom where the sides are smooth and the bottom is smooth and substantially horizontal;

providing an attachable storage container configured to be connected to the bottom of at least one material container, the material container having smooth, substantially flat sidewalls with little or no protrusions proximate the bottom of the material container, wherein the material container comprises sides are unified with the bottom, wherein the sides of the material container and the bottom of the material container are smooth and substantially horizontal, and wherein the attachable storage container comprises a compartment, the compartment comprising:

a compartment, the compartment comprising:

a compartment top having a substantially horizontal surface and an outer edge that is within 0.25 inches of the material container sides proximate the bottom of the material container;

compartment sides continuously united with the outer edge of the compartment top, extending downward, ending in an edge comprising a first part of an attachment element, and a compartment base comprising a second part of the attachment element configured to detach and attach in a repeatable manner to the first part of the attachment element, and the compartment base is extended outward from the second part of the attachment element at least 0.13 inches and is configured with structure to provide increased standing stability of a combination of the attachable storage container and a material container; and a releasable joining element configured to affix the attachable storage container to the bottom of the material container; and engaging the joining element thereby attaching the top of the storage container to the bottom of the material container in a manner that allows for the stable placement of the conjoined storage container and material container on a substantially horizontal surface.

11. The method of claim 10 wherein the storage container apparatus further comprises at least a first accessory stored within the storage container and the method, further comprises the steps of:

detaching the compartment side from the compartment base, removing at least the first accessory from the storage container; and using at least the first accessory.

12. The method of claim 11, further comprising the step of returning at least the first accessory back into the storage container apparatus upon completion of use.

13. The method of claim 10, further comprising:

detachably attaching at least one accessory to the bottom of the base of the storage container apparatus.

14. The method of claim 10 wherein a first part of the attaching element is a beaded edge and a second part of the attachment element is a channel configured to receive the beaded edge of the first part of the attaching element in a detachably attaching manner.

15. The method of claim 10, further comprising the steps of:

providing a second material container;

disengaging the joining element to detach storage container from the material container; and engaging the joining element to attach the storage container to a second material container in a manner that allows for the stable placement of the storage container and material container on a substantially horizontal surface.

16. The storage apparatus of claim 7 wherein the at least one accessory is selected from a funnel for use in dispensing fluid concentrate and dilution fluid into the container, at least one reusable wipe element for smoothly spreading dispensed fluid onto a surface, an abrasive smoothing material for obtaining smooth finishes, accessories associated with the preparation of coffee, a snake for cleaning drains, paint can key openers, removable pouring spouts, and an abrasive material for cleaning surfaces.

* * * * *